(12) United States Patent
Neuwen et al.

(10) Patent No.: US 10,022,296 B2
(45) Date of Patent: Jul. 17, 2018

(54) FLUID INJECTION SYSTEM

(71) Applicant: Heat Trap Solar Pty Ltd, Osborne Park (AU)

(72) Inventors: David Bernard Neuwen, Osborne Park (AU); Ashley Challenor, Osborne Park (AU)

(73) Assignee: Heat Trap Solar Pty Ltd, Osborne Park (AU)

( * ) Notice: Subject to any disclaimer, the term of this patent is extended or adjusted under 35 U.S.C. 154(b) by 0 days.

(21) Appl. No.: 15/324,643

(22) PCT Filed: Apr. 7, 2015

(86) PCT No.: PCT/AU2015/000210
§ 371 (c)(1),
(2) Date: Jan. 6, 2017

(87) PCT Pub. No.: WO2016/004454
PCT Pub. Date: Jan. 14, 2016

(65) Prior Publication Data
US 2017/0202737 A1    Jul. 20, 2017

(30) Foreign Application Priority Data

Jul. 7, 2014    (AU) ................................ 2014902619

(51) Int. Cl.
*A61H 33/00*    (2006.01)
*A61H 35/02*    (2006.01)
(Continued)

(52) U.S. Cl.
CPC ......... *A61H 35/02* (2013.01); *A61H 33/0095* (2013.01); *F17D 1/14* (2013.01);
(Continued)

(58) Field of Classification Search
CPC ................ A61H 35/02; A61H 33/0095; A61H 2201/0214
(Continued)

(56) References Cited

U.S. PATENT DOCUMENTS 5,331,694 A * 7/1994 Mackenzie ............ A47K 3/286
138/103
6,711,758 B1    3/2004 Terek et al.
(Continued)

FOREIGN PATENT DOCUMENTS

CN    201370744 Y    12/2009
CN    203657178 U    6/2014

OTHER PUBLICATIONS

Austrailian Application No. 2015286241, Examination Report dated Nov. 8, 2017, 2 pgs.
(Continued)

*Primary Examiner* — Huyen Le
(74) *Attorney, Agent, or Firm* — Schwegman Lundberg & Woessner, P.A.

(57) ABSTRACT

The present invention provides a fluid injection system (11) which transitions between a maintenance mode wherein an outlet (15) is closed and no fluid is discharged through the outlet, and an operation mode, wherein the outlet is open and fluid is discharged through the outlet. The fluid injection system injects a first fluid transported in a first pipeline (21) with a second fluid, wherein there is a temperature differential between the first fluid and the second fluid. The fluid injection system comprises a holding tank (49) for storing the second fluid, a cooling means (35) to cool the second fluid, and a pump (39) for delivering the second fluid into the first pipeline. The second fluid mixes with the first fluid in the first pipeline to provide a combined third fluid having a temperature within a predetermined temperature range, wherein the third fluid is maintained within the predeter- (Continued)

mined temperature range when the fluid injection system is in either mode such that the temperature of the third fluid made available to an outlet is within the predetermined temperature range.

21 Claims, 3 Drawing Sheets

(51) Int. Cl.
  *F17D 1/14* (2006.01)
  *G05D 23/19* (2006.01)
  *F24D 17/00* (2006.01)
(52) U.S. Cl.
  CPC ......... *F24D 17/0078* (2013.01); *G05D 23/19* (2013.01); *A61H 2201/0207* (2013.01); *A61H 2201/0214* (2013.01); *A61H 2201/5082* (2013.01)
(58) Field of Classification Search
  USPC .............................................. 4/620
  See application file for complete search history.

(56) References Cited

U.S. PATENT DOCUMENTS

| | | | |
|---|---|---|---|
| 2004/0039354 A1 | 2/2004 | Lutz, II | |
| 2009/0069798 A1* | 3/2009 | Muller | A61F 9/007 606/33 |
| 2016/0108324 A1* | 4/2016 | Johnsen | C10G 9/007 166/267 |

OTHER PUBLICATIONS

European Application No. 15819111.4, Amendment to Claim filed Sep. 4, 2017, 7 pgs.
International Application No. PCT/AU2015/000210, International Preliminary Report on Patentability dated Sep. 12, 2016, 52 pgs.
International Application No. PCT/AU2015/000210, International Search Report and Written Opinion dated Jul. 31, 2015, 9 pgs.

* cited by examiner

FLUID INJECTION SYSTEM

This application is a U.S. National Stage Filing under 35 U.S.C. 371 from International Application No. PCT/AU2015/000210, filed on Apr. 7, 2015, and published as WO 2016/004454 A1 on Jan. 14, 2016, which claims the benefit of priority to Australia Patent Application No. 2014902619, filed on Jul. 7, 2014, each of which is hereby incorporated by reference herein in its entirety.

TECHNICAL FIELD

The present invention generally relates to a fluid injection system. In particular the present invention relates to a system for injecting a fluid into a fluid pipeline whereby the injected fluid is at a different temperature to the fluid in the fluid pipeline.

BACKGROUND ART

It is common practice across numerous industries to store a volume of fluid ready for use upon the turn of a tap. The fluid may be stored remote from the outlet and piped to the outlet, or may be stored in close proximity to the outlet.

In one application the stored fluid is required for use in flushing stations. Flushing stations are used for the emergency treatment of the eyes and body of a person who has been exposed to materials and or environments which may cause injuries. A flushing station typically comprises an eye bath, or a face wash basin or a deluge shower or a combination of these elements. These flushing stations are a necessary safety installation in many industries, and are critical in areas where an operator may be exposed to materials or environments which may cause injuries.

In some jurisdictions Governments provide standards which industries are recommended to comply with in relation to the number and placement of the flushing stations. These standards also recommend a tepid temperature range for the fluid exiting the flushing station. For instance, Australian Standard AS4775-2007 Emergency eyewash and shower equipment advises "there is no medically or industry accepted standard for the temperature range of fluids that may be defined as tepid. The term is used to allow the acceptable temperature range for a particular workplace environment to be decided based on factors such as the geological location of the equipment, the location of the equipment within the facility and the types of hazardous materials to which the person may be exposed. A recommended temperature range for tepid fluids is 15.6° C. to 37.8° C.

Flushing stations are essential at all worksites where hazardous materials may exist. Numerous worksites are located in regions throughout the world where ambient temperatures exceed the upper limit of the temperature range described as tepid. These high ambient temperatures heat the fluid in the fluid piping and storage system, especially if the fluid is in a pipe exposed to direct sunlight.

A person exposed to a flushing fluid delivered at a temperature above the upper limit for a tepid fluid is in danger of being injured by the heat contained in the flushing fluid. Australian Standard AS4775-2007 states in clause D5 Flushing Fluid Temperature "Continuous and timely irrigation of affected tissues for the recommended irrigation period are the principal factors in providing first aid treatment. Providing flushing fluid at temperatures conducive to use for the recommended irrigation period is considered an integral part of providing suitable facilities. Medical recommendations suggest a flushing fluid at tepid temperatures be delivered to affected chemically-injured tissue. Temperatures in excess of 38° C. have proven to be harmful to the eyes and can enhance chemical interaction with the eyes and skin. During design and installation, the effects of exposure of piping to sun, radiant heat or other heat sources should be considered, and suitable control measures should be introduced to avoid any risk of scalding."

Currently there are no suitable systems available which will ensure tepid fluid is available to the flushing station as and when required when the temperature of the flushing fluid in the supply pipework to the flushing station is above the recommended range of temperatures for tepid fluids.

One system which has been in use utilises a relief valve positioned close to the flushing station outlet. The relief valve is typically set to purge fluid within the pipe when the fluid reaches 39'C. The valve will remain open until the temperature drops to 29° C. In hot environments, this often means that the relief valve is open all day, constantly discharging fluid from the pipe. It is undesirable and often a safety hazard to discharge fluid, generally water, in this way. If the relief valve is subsequently shut off the fluid in the pipe can often be heated above the recommended range of temperatures for tepid fluids.

Another system uses a chiller unit placed in-line with a pipeline. As the fluid passes through the pipe the chiller acts as a heat exchanger to chill the fluid. As the chiller requires significant power it must be wired back to a main electrical board which in itself can be a costly process. Furthermore, as the pipework servicing the flushing station is generally exposed to atmospheric conditions, a chiller unit will take a few minutes of operation before the fluid held in the pipework is discharged and the chilled fluid within the recommended range of temperatures for a tepid fluid can be delivered This system does not mitigate the risk of a person injuring themselves as the initial fluid delivered to the flushing station may be at a temperature which is above the recommended range of temperatures for a tepid fluid, possibly leading to further injury.

Another system uses a refrigerated pressure vessel to deliver cooled fluid to a flushing station. These vessels are quite large and often difficult to accommodate in the areas where flushing stations are required. Furthermore, the need to pressurise and insulate a large vessel is both difficult and expensive. In addition, it is difficult to control the temperature of the fluid being delivered to the flushing station as the fluid supplied to the pressure vessel during operation of the flushing station will mix with the cooled fluid in the tank in a non-uniform manner. As a result, the fluid delivered to the flushing station may fluctuate in temperature and may exceed the recommended range of temperatures for a tepid fluid.

The preceding discussion of the background art is intended to facilitate an understanding of the present invention only. The discussion is not an acknowledgement or admission that any of the material referred to is or was part of the common general knowledge as at the priority date of the application.

SUMMARY OF INVENTION

It is an object of this invention to provide a fluid injection system which ameliorates, mitigates or overcomes, at least one disadvantage of the prior art, or which will at least provide the public with a practical choice.

An application of the present invention is the provision of tepid water to a flushing station. However, the present invention can be designed to deliver liquid within any designated temperature range. The scope of the present invention is therefore intended to cover the delivery of liquid at any temperature range, including when the required temperature range is above the fluid being delivered to the system.

The present invention further provides a fluid injection system which transitions between a maintenance mode and an operation mode, the fluid injection system injects a first fluid transported in a first pipeline with a second fluid, wherein there is a temperature differential between the first fluid and the second fluid, the fluid injection system comprises:
a holding tank for storing the second fluid;
a temperature means to bring the temperature of the second fluid to a predetermined value range;
a pump for delivering the second fluid into the first pipeline;
wherein the second fluid mixes with the first fluid in the first pipeline to provide a combined third fluid having a temperature within a predetermined temperature range, wherein the third fluid is maintained within the predetermined temperature range when the fluid injection system is in either mode such that the temperature of the third fluid made available to an outlet is within the predetermined temperature range.

The present invention further provides a fluid injection system which transitions between a maintenance mode wherein an outlet is closed and no fluid is discharged through the outlet, and an operation mode, wherein the outlet is open and fluid is discharged through the outlet, the fluid injection system injects a first fluid transported in a first pipeline with a second fluid, wherein there is a temperature differential between the first fluid and the second fluid, the fluid injection system comprises:
a holding tank for storing the second fluid;
a cooling means to cool the second fluid;
a pump for delivering the second fluid into the first pipeline;
wherein the second fluid mixes with the first fluid in the first pipeline to provide a combined third fluid having a temperature within a predetermined temperature range, wherein the third fluid is maintained within the predetermined temperature range when the fluid injection system is in either mode such that the temperature of the third fluid made available to an outlet is within the predetermined temperature range.

In contrast to the prior art, as soon as the outlet is opened the fluid injection system moves from the maintenance mode to the operation mode and delivers through the outlet the third fluid which is within the predetermined temperature range. As the third fluid is immediately available at a desired temperature, an operator will be able to use the fluid as soon as the outlet is open without having to wait for the third fluid to reach the desired temperature. In those applications where the outlet of the fluid injection system is connected to a flushing station, the present invention will allow an operator to turn the flushing station on and be able to immediately use the flushing station knowing they will not be injured by the initial discharge of fluid, which could otherwise be excessively heated.

The first pipeline may be in fluid communication with the outlet. The first pipeline may extend between the water supply and the outlet. The outlet may be in communication with a flushing station having a shower, an eye bath and/or a face wash basin. The first pipeline may incorporate a check valve.

The cooling means may comprise a first heat exchange system and a second heat exchange system. In various applications of the invention the cooling means may provide the second fluid at an increased or decreased temperature relative to the temperature of the first fluid. This is to be considered within the scope of this invention.

The cooling means can take the form of any apparatus which is able to cause the second fluid to be at a temperature which is different to that of the first fluid.

The second heat exchange system may comprise a refrigeration apparatus having a second coil received in the holding tank for cooling the second fluid.

The second heat exchanger can take any form as would be known to the person skilled in the art while still being within the scope of this invention.

The holding tank may be insulated. The holding tank may be suitably insulated to operate in its operating environment.

The fluid injection system may also comprise a control means to control the delivery of the second fluid to the first pipeline. The control means will ensure the required second fluid is delivered to the pipeline to ensure the resulting third fluid falls within the predetermined temperature range.

The control means may also regulate the flow of the second fluid into the first pipeline according to the pressure in the first pipeline.

In one aspect of the invention the control means incorporate a control valve. A second pipeline for delivering the second fluid to the first pipeline incorporates a bypass pipeline to allow low flow rates to flow through the second pipeline.

In another aspect of the invention the second pipeline incorporates a tempering valve for providing the third fluid.

In another aspect of the invention the second pipeline incorporates a control valve for delivering the second fluid to the first pipeline within a predetermined flow range.

The control means may incorporate the pump. In an embodiment of the invention the pump may be variably operable. The control means may comprise a plurality of sensors for sensing the characteristics of the fluid. These characteristics may include pressure and/or temperature.

The control means may also incorporate a check valve.

The second fluid may be delivered to the first pipeline through the second pipeline.

The fluid injection system may further comprise a diverting pipeline for diverting a portion of the first fluid in the first pipeline to the holding tank.

The second pipeline may deliver the second fluid from the holding tank to the first pipeline at a position downstream from where the diverting pipeline is connected to the first pipeline. The second pipeline may incorporate the pump.

The fluid injection system may also comprise a third pipeline for circulating the third fluid through a temperature regulating means when the fluid injection system is in its maintenance mode.

In one aspect of the invention the temperature regulating means is incorporated as part of the cooling means.

In another aspect of the invention the temperature regulating means is in the form of a separate heat exchange unit, or similar system for altering temperature of the third fluid.

Preferably the temperature regulating means incorporates a tempering valve.

The third pipeline comprises a pump for circulating the third fluid through the temperature regulating means.

The third pipeline comprises a first section which extends from the temperature regulating means to the first pipeline at a point in close proximity to the outlet, or at the point on the first pipeline which delivers the fluid to the flushing station.

The third pipeline comprises a second section extending from where the second section connects to the first pipeline to the temperature regulating means. The second section may be connected to the first pipeline at a position upstream from where the first section is connected to the first pipeline.

The temperature regulating means may be provided by the first heat exchange system. The first heat exchange system may comprise a first coil immersed within the fluid in the tank.

The fluid injection system may have a temperature sensor which isolates the fluid injection system if the temperature of the first fluid is within the predetermined temperature range.

The fluid injection system may incorporate one or more sterilising units therein.

The fluid injection system may incorporate one or more non-return valves therein.

The fluid injection system may provide a chilled fluid for other purposes. For instance the fluid injection system may incorporate a tap through which chilled drinking water may be delivered. The fluid injection system may comprise a fourth pipeline extending from the first pipeline to a tap outlet. The fourth pipeline is in fluid communication with a third heat exchanger which is in the form of a third coil. The third coil may be located in the holding tank. The fourth pipeline diverts a portion of the first fluid from the first pipeline. The portion travels through the third coil in the holding tank, resulting in the cooling/chilling of the fluid therein. Upon opening the tap the chilled fluid is discharged therefrom.

All or a portion of each pipeline may be insulated.

The fluid injection system may be housed in an insulated housing.

The first fluid and second fluid may be water.

The present invention further provides a fluid injection system which transitions between a maintenance mode and an operation mode, the fluid injection system injects a first fluid transported in a first pipeline with a second fluid to produce a third fluid, wherein the third fluid is at a temperature between the first fluid and the second fluid, the fluid injection system comprises:
 a tank from which the second fluid is discharged and delivered to the first pipeline;
 a cooling means to cool the second fluid in the tank;
 a third pipeline through which the third fluid is taken from a second portion of the first pipeline and circulated through the cooling means to maintain the third fluid in the second portion within a predetermined temperature range, the second portion extending between an outlet through which the third fluid may be discharged, and a junction adjacent but upstream from where the second fluid is injected into the first pipeline;
wherein the third fluid is maintained within the predetermined temperature range when the fluid injection system is in either mode.

The present invention further provides a fluid injection system which transitions between a maintenance mode wherein an outlet at a flushing station is closed and no fluid is discharged through the outlet, and an operation mode wherein the outlet at the flushing station is open and fluid is discharged through the outlet, the fluid injection system injects a first fluid transported in a first pipeline with a second fluid to produce a third fluid which is at a temperature between that of the first fluid and the second fluid, the fluid injection system comprises:
 a holding tank for storing the second fluid;
 a temperature means to bring the temperature of the second fluid within a predetermined value range;
 a pump for delivering the second fluid into the first pipeline;
 a third pipeline for circulating the third fluid through a heat exchange unit when the fluid injection system is in its maintenance mode;
whereupon the second fluid mixing with the first fluid the third fluid has a temperature which is within a predetermined temperature range, wherein the third fluid is maintained within the predetermined temperature range when the fluid injection system is in either mode such that the temperature of the third fluid made available to the outlet at the flushing station is within the predetermined temperature range.

The present invention further provides a fluid injection system which transitions between a maintenance mode wherein an outlet at a flushing station is closed and no fluid is discharged through the outlet, and an operation mode wherein the outlet at the flushing station is open and fluid is discharged through the outlet, the fluid injection system injects a first fluid transported in a first pipeline with a second fluid, wherein there is a temperature differential between the first fluid and the second fluid, the fluid injection system comprises:
 a holding tank for storing the second fluid;
 a temperature means to bring the temperature of the second fluid within a predetermined value range;
 a pump for delivering the second fluid into the first pipeline;
 a second pipeline for delivering the second fluid to the first pipeline, the second pipeline incorporating a bypass pipeline to allow low flow rates to flow through the second pipeline.
wherein the second fluid mixes with the first fluid in the first pipeline to provide a combined third fluid having a temperature within a predetermined temperature range, wherein the third fluid circulates through a third pipeline incorporating a heat exchange unit when the system is in the maintenance mode, the third fluid is maintained within the predetermined temperature range when the fluid injection system is in either mode such that the temperature of the third fluid made available to the outlet at the flushing station is within the predetermined temperature range.

BRIEF DESCRIPTION OF THE DRAWINGS

Further features of the present invention are more fully described in the following description of three non-limiting embodiments thereof. This description is included solely for the purposes of exemplifying the present invention. It should not be understood as a restriction on the broad summary, disclosure or description of the invention as set out above.

The description will be made with reference to the following Figures.

In the drawings like structures are referred to by like numerals throughout the several views. The drawings shown are not necessarily to scale, with emphasis instead generally being placed upon illustrating the principles of the present invention.

DESCRIPTION OF EMBODIMENTS

The present invention is particularly suited for providing a fluid to an outlet, wherein the fluid available to the outlet meets certain temperature parameters. The present invention achieves this outcome in a reliable, efficient and cost effective manner.

The present embodiments relate to the provision of tepid water to a flushing station. These flushing stations are typically found at various locations on worksites and provide a means to immediately treat a person who may have been exposed to a hazardous situation (e.g. chemical exposure, fire). However, it is to be understood that the scope of the present invention is not limited to this application. The present invention can be designed to deliver liquid which is within any designated temperature range. For instance the fluid injection system of the present invention water may discharge water at 60° C. to 80° C. and into cold potable water supplies to provide mixed water at 25° C.

The embodiments relate to the delivery of a fluid to a flushing station, wherein the fluid must be delivered to the flushing station at a temperature falling within a predetermined temperature range. In these embodiments this predetermined temperature range equates to the temperature range for a tepid fluid. An important aspect of the present invention is the ability to deliver a fluid at a tepid temperature as soon as operation of the flushing station is initiated. Provided sufficient fluid is available in a holding tank 49 at a predetermined temperature range this aspect is independent on whether the flushing station was recently operated, or had not been operated for a long period of time.

Figure 1:
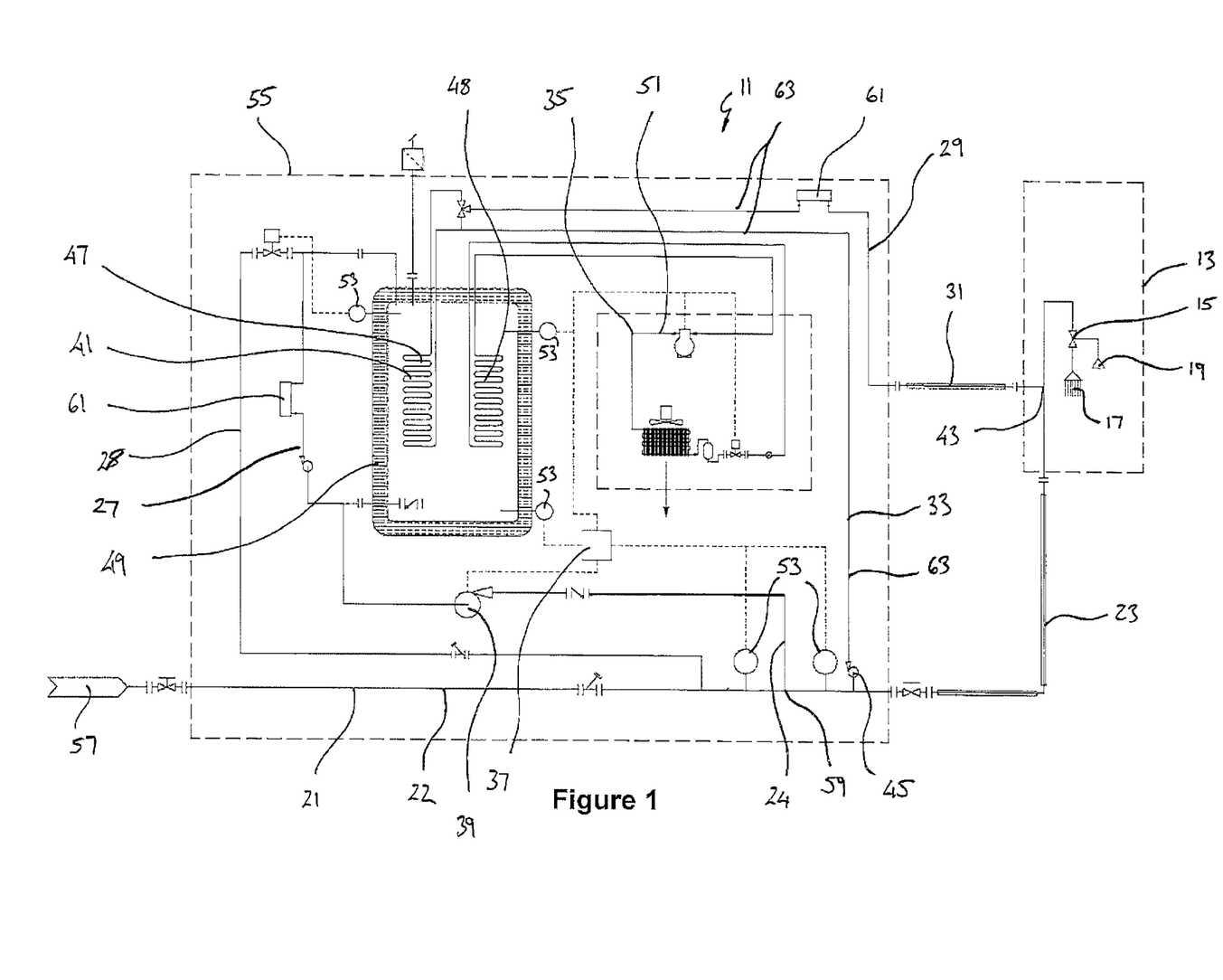
FIG. 1 is a schematic representation of a fluid injection system according to a first embodiment of the invention.

Referring to FIG. 1, the invention according to the first embodiment is in the form of a fluid injection system 11 for discharging a third fluid to an outlet 15 wherein the third fluid is discharged at a temperature within the temperature range for a tepid fluid to a flushing station 13.

The flushing station comprises the outlet 15 which branches to a shower 17 and a wash basin 19. The shower 17 and wash basin 19 are located sufficiently close to the outlet 15 such that when operation of the flushing station 13 is initiated the fluid delivered to the flushing station 13, including the initial flow, is within the temperature range for a tepid fluid. The delivered fluid remains within this temperature range with continued operation of the flushing station.

The fluid injection system 11 comprises a network of pipelines, as discussed below, a cooling means 35 and a control means 37 for regulating the system 11 such that the third fluid is delivered to the outlet 15 within the temperature range for a tepid fluid.

The cooling means 35 is associated with the insulated holding tank 49, and comprises a refrigeration apparatus 51, a first heat exchange system, in the form of a first coil 47, and a second heat exchange system, in the form of a second coil 48. The holding tank 49 is adapted to receive a first fluid for cooling to a lower temperature, and is adapted to discharge a second fluid, as will be explained below.

The refrigeration apparatus 51 is in fluid communication with the second coil 48, which is immersed in the fluid located in the holding tank 49 for cooling the fluid therein. The refrigeration apparatus 51 may be operated through mains power or may have an independent power supply such as a solar panel/battery system.

The fluid injection system 11 is adapted to be connected to a first pipeline 21 which extends between a water supply, such as mains water 57, and the outlet 15. The water supply provides the first fluid.

The fluid injection system 11 also comprises a diverting pipeline 28 for diverting a portion of the first fluid in the first pipeline 21 to the holding tank 49. The cooling means 35 then cools the fluid to provide the second fluid.

The fluid injection system 11 further comprises a second pipeline 24. The second pipeline 24 is connected to the first pipeline 21 at a junction 59 and delivers the second fluid from the holding tank 49 to the first pipeline 21 at a position downstream from where the diverting pipeline 28 is connected to the first pipeline 21.

The second pipeline 24 injects the second fluid into the first pipeline 21 whereby the first fluid and second fluid mix to provide the third fluid. In the present embodiment the second fluid is at a lower temperature than the first fluid such that the resulting third fluid is at a temperature lower than the first fluid, but higher than the second fluid.

The first pipeline 21 comprises a first portion 22 and a second portion 23. The first portion 22 is connected to the water mains 57 which supplies the first fluid. The first portion 22 extends between the water mains 57 and the junction 59 where the second fluid is delivered to the first pipeline. The second portion 23 extends between the junction 59 and the outlet 15.

The second pipeline 24 of the fluid injection system 11 incorporates a primary pump 39 which is variably operable, and is controlled by the control means 37 to ensure the second fluid is delivered to the first pipeline 21 in accordance with the conditions required to ensure the resulting third fluid is at a temperature for tepid water.

The fluid injection system 11 further comprises a third pipeline 29 for circulating the third fluid through a temperature regulating means 41. The third pipeline 29 comprises a first section 31 and a second section 33.

The first section 31 extends between the temperature regulating means 41 and a connection 43 which is adjacent the outlet 15. The first section delivers the third fluid from the temperature regulating means 41.

The second section 33 extends between the first pipeline 21 and the temperature regulating means 41 and incorporates a secondary pump 45. The second section 33 returns the third fluid to the temperature regulating means 41. The second section 33 is connected to the first pipeline 21 at a position downstream from connection 43 but in close proximity to the junction 59. The secondary pump 45 is located adjacent the junction 59.

The temperature regulating means 41 is incorporated in the cooling means and is in the form of the first coil 47, which is immersed in the fluid in the holding tank 49, and a tempering valve. The first coil 47 is incorporated in the third pipeline 29, linking the first section 31 and second section 33.

The control means 37 receives various temperature and pressure readings from sensors 53 positioned in the fluid injection system 11 and along the first pipeline 21. On the basis of the readings the control means 37 adjusts the operation of the primary pump 39, secondary pump 45 and refrigeration unit 51 in order to ensure the third fluid delivered to the outlet 15 is tepid.

The cooling means 35 is controlled by the controlled means 37 such that it cools the first fluid which enters the holding tank 49 to the required temperature, before being discharged from the holding tank 49 as the second fluid. The fluid in the tank 49 is cooled by the second coil 48, but also provides the cooling for the fluid passing through the first coil 47.

The fluid injection system 11 also comprises a recirculating pipeline 27 which recirculates the fluid in the holding tank 49 from the bottom of the tank to the top.

The recirculating pipeline 27 and third pipeline 29 each include a sterilisation unit 61 inline therewith for sanitising the fluid as it passes therethrough. In other embodiments, sterilization units may be incorporated where required.

The fluid injection system 11 is housed in an insulated housing 55.

While flushing stations 13 are a mandated piece of equipment in various industries, they are very rarely used. However, during periods of non-use the fluid injection system 11 must maintain function to ensure the third fluid will be within the recommended temperature range for a tepid fluid as soon as the flushing station 13 is operated. The fluid injection system 11 therefore transitions between a maintenance mode wherein the outlet remains closed, and an operation mode wherein the outlet 15 is open and the third fluid is discharged therethrough.

In the maintenance mode there is no flow of the first fluid through the first portion 22 of the first pipeline 21, and no flow of the second fluid through the second pipeline 24. When the flushing station 13 is in its maintenance mode the third pipeline co-operates with the second portion 23 of the first pipeline as well as the first coil 47 to provide a ringmain 63. In the maintenance mode the secondary pump 45 operates to circulate the third fluid around the ring main. As the third fluid passes through the holding tank 49, the cooling means cools the third fluid to maintain the third fluid within the required temperature range for tepid water.

The secondary pump 45 circulates the third fluid through the second section 33 of the third pipeline 29, through the first coil 47, cooling the third fluid as it flows therethrough. The cooled third fluid then passes through the first section 31 of the third pipeline 29, through connection 43 and back into the second portion 23 of the first pipeline 21.

In the maintenance mode the operation of the secondary pump 45 may be continuous or intermittent, depending on the conditions in which the fluid injection system 11 is installed. In other embodiments the control means 37 may operate the secondary pump 45 based on readings from additional parameters installed relative to the third pipeline 29.

When installed on site, the second portion 23 of the first pipeline 21 is typically exposed to environmental conditions. While the second portion 23 may be insulated the third fluid within that section will still absorb heat and quickly heat to a temperature above the recommended temperature range for a tepid fluid. If the flushing station 13 was operated, the heated third fluid in the second portion 23 would be the first to discharge. Without monitoring and appropriately circulating the third fluid the initial discharge of the heated third fluid may cause an operator serious damage, especially if the eye wash was to be used. It is therefore critical to prevent the third fluid from heating beyond the recommended temperature range for a tepid fluid when the fluid injection system 11 is in its maintenance mode. The circulation of the third fluid through the ringmain 63 ensures the third fluid in the second portion 23 is maintained at the requisite temperature. As a result, as soon as the flushing station 13 moves from maintenance mode to operation mode the third fluid discharged through the outlet 15 will be within the required temperature range, ensuring the operator of the flushing station is not injured by heated fluid.

In the operation mode, the control means 37 activates primary pump 39 which delivers the second fluid from the holding tank 49 to the first pipeline 21 at the junction 59. This causes the third fluid located in the second portion 23 of the first pipeline to be discharged through the open outlet 15. Once this is discharged the third fluid formed by the mixing of the first fluid and the second fluid at the junction 59 continues to be discharged through the outlet 15. This continues until the outlet 15 is closed and the fluid injection system 11 returns to its maintenance mode.

Figure 2:
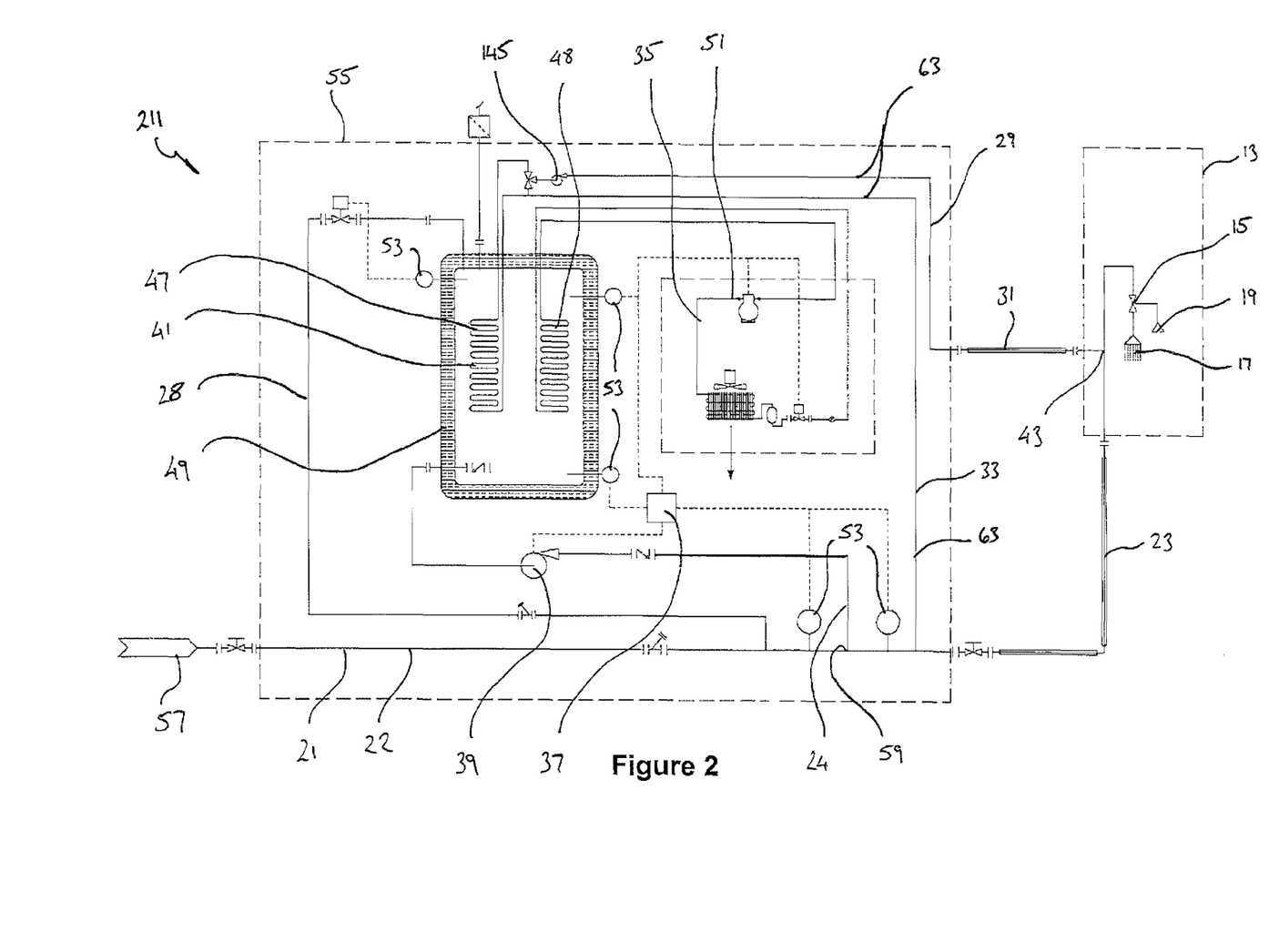
FIG. 2 is a schematic representation of a fluid injection system according to a second embodiment of the invention.

A second embodiment of the invention is illustrated in FIG. 2. For convenience features of the fluid injection system 211 that are similar or correspond to features of the fluid injection system 11 of the first embodiment have been referenced with the same reference numerals.

The fluid injection system 211 of the second embodiment is of slightly different configuration including the positioning of the secondary pump 45 in close proximity to the first coil 47.

Figure 3:
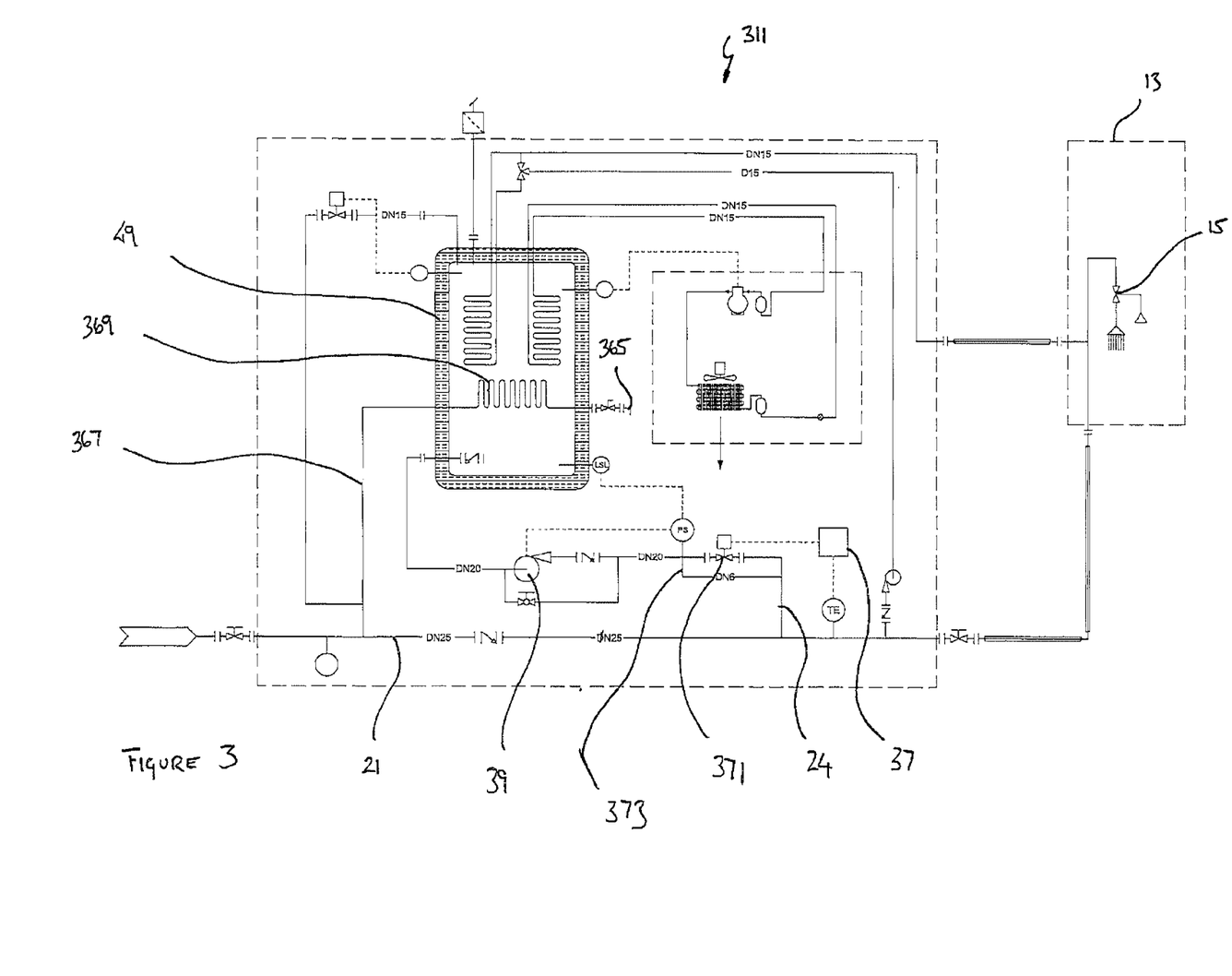
FIG. 3 is a schematic representation of a fluid injection system according to a third embodiment of the invention.

A third embodiment of the invention is illustrated in FIG. 3. For convenience features of the fluid injection system 311 that are similar or correspond to features of the fluid injection system 11 of the first embodiment have been referenced with the same reference numerals.

In the third embodiment the control means incorporates a control valve 371 to regulate the flow of the second fluid from the holding tank 49 to the first pipeline 21. The second pipeline 24 incorporates a bypass pipeline 373 which bypasses control valve 371. The bypass pipeline 373 is of relatively small bore so that the flow of the second fluid therethrough is suitably low. In operation, the flushing station 13 may only need to be supplied with a low volume of the second liquid, as may be the case when the first fluid is only slightly outside the range for tepid water resulting in minimal need for the first fluid to mix with the cooler second fluid. In these scenarios the required volume of the second fluid is low. Without the bypass pipeline 373 the control means 37 will intermittently operate the primary pump 39, and the control valve 371 will be caused to move between open and closed positions. This will result in the temperature of the third fluid being delivered through the outlet 15 to fluctuate as the delivery of the second fluid to the first fluid is not uniform. To prevent this from happening the bypass pipeline 373 is incorporated within the second pipeline. The bypass pipeline 373 allows a low volume of the second fluid to pass into the first pipeline and mix with the first fluid without the control means 37 having to activate the control valve 371. As a result the third fluid discharged through the outlet 15 is more uniform in temperature. Another example of when the bypass pipeline 373 is of importance is when only a low volume of liquid is required to be discharged through the outlet 15, such as during an eye wash procedure.

The fluid injection system 311 has further functionality in that it can provide a chilled fluid for other purposes, such as drinking in the case of the fluid being water. In such an application the fluid injection system 311 provides a tap 365 through which chilled drinking water may be delivered. The fluid injection system 311 comprises a fourth pipeline 367 extending from the first pipeline 21 to the tap 365. The fourth pipeline 367 is in fluid communication with a third heat exchanger which is in the form of a third coil 369. The third coil 369 is located in the holding tank 49. The fourth pipeline 367 diverts a portion of the first fluid from the first pipeline 21 and chills the fluid as it travels through the third coil 369. Upon opening the tap 365 the chilled fluid is discharged therefrom.

The bypass under the control valve is an operating bypass. The sizing of this bypass is important. For example, during low flow the bypass should be sized large enough so the control valve stays shut but not large enough that the temperature of the mixed water is below 15.6° C. irrespective of the temperature of the incoming water. The bypass also has to be large enough so the temperature of the mixed water doesn't increase too high when the flow changes from low flow (when the control valve is closed) to high flow, i.e. not above 37.8° C. By the same token, the bypass should not be too large such that if the flow changes from high flow (control valve fully open) to low flow, the mixed water temperature doesn't drop below 15.6° C.

The present invention ensures that a flushing station can be used immediately by the operator without the operator first having to wait for the fluid to reach a suitable temperature. In addition the present invention minimises the likelihood of the buildup of a biofilm within the pipes. In conventional flushing stations biofilm builds up in the pipes. When the system is turned on the shock through the system causes the biofilm to loosen and is discharged through the outlet. By recirculating the water within the present invention the development of a biofilm is minimised.

The present invention can also be regulated to minimise the growth of bacteria. As the fluid can be maintained at a temperature less than 35° C. bacteria within the system can be minimised. This negates the need for sterilisation units.

Modifications and variations such as would be apparent to the skilled addressee are considered to fall within the scope of the present invention. The present invention is not to be limited in scope by any of the specific embodiments described herein. These embodiments are intended for the purpose of exemplification only. Functionally equivalent products, formulations and methods are clearly within the scope of the invention as described herein.

Reference to positional descriptions, such as lower and upper, are to be taken in context of the embodiments depicted in the figures, and are not to be taken as limiting the invention to the literal interpretation of the term but rather as would be understood by the skilled addressee.

Throughout this specification, unless the context requires otherwise, the word "comprise" or variations such as "comprises" or "comprising", will be understood to imply the inclusion of a stated integer or group of integers but not the exclusion of any other integer or group of integers.

The invention claimed is:

1. A fluid injection system which transitions between a maintenance mode and an operation mode, the fluid injection system injects a first fluid transported in a first pipeline with a second fluid to produce a third fluid; wherein the third fluid is at a temperature between the first fluid and the second fluid, the fluid injection system comprises:
   a tank from which the second fluid is discharged and delivered to the first pipeline;
   a cooling means to cool the second fluid in the tank;
   a third pipeline through which the third fluid is taken from a second portion of the first pipeline and circulated through the cooling means to maintain the third fluid in the second portion within a predetermined temperature range, the second portion extending between an outlet through which the third fluid is discharged, and a junction adjacent but downstream from where the second fluid is injected into the first pipeline;
   wherein the third fluid is maintained within the predetermined temperature range when the fluid injection system is in either mode.

2. The fluid injection system according to claim 1 wherein the first pipeline is in fluid communication with the outlet.

3. The fluid injection system according to claim 1 wherein the cooling means comprises a first heat exchange system and a second heat exchange system.

4. The fluid injection system according to claim 3 wherein the second heat exchange system comprises a refrigeration apparatus having a second coil received in the holding tank for cooling the second fluid.

5. The fluid injection system according to claim 3 wherein the third pipeline circulates the third fluid through a temperature regulating means when the fluid injection system is in its maintenance mode.

6. The fluid injection system according to claim 5 wherein the temperature regulating means incorporates a tempering valve.

7. The fluid injection system according to claim 5 wherein the third pipeline comprises a first section, which extends from the temperature regulating means to the first pipeline at a point in close proximity to the outlet, or at the point on the first pipeline which delivers the fluid to the flushing station.

8. The fluid injection system according to claim 7 wherein the third pipeline comprises a second section extending from where the second section connects to the first pipeline to the temperature regulating means.

9. The fluid injection system according to claim 8 wherein the second section is connected to the first pipeline at a position upstream from where the first section is connected to the first pipeline.

10. The fluid injection system according to claim 5 wherein the temperature regulating means is provided by the first heat exchange system, the first heat exchange system comprises a first coil immersed within the fluid in the tank.

11. The fluid injection system according to claim 1 comprising a control means to control the delivery of the second fluid to the first pipeline wherein the resulting third fluid falls within the predetermined temperature range.

12. The fluid injection system according to claim 11 wherein the control means incorporates a check valve.

13. The fluid injection system according to claim 11 wherein the second fluid is delivered to the first pipeline through a second pipeline, the second pipeline for delivering the second fluid to the first pipeline incorporates a bypass pipeline to allow low flow rates to flow through the second pipeline.

14. The fluid injection system according to claim 11 wherein the control means comprises a plurality of sensors for sensing the characteristics of the fluid.

15. The fluid injection system according to claim 1 wherein the second fluid is delivered to the first pipeline through a second pipeline, the second pipeline incorporates a control valve for delivering the second fluid to the first pipeline within a predetermined flow range.

16. The fluid injection system according to claim 1 further comprising a diverting pipeline for diverting a portion of the first fluid in the first pipeline to the holding tank.

17. The fluid injection system according to claim 16 wherein the second pipeline delivers the second fluid from the holding tank to the first pipeline at a position downstream from where the diverting pipeline is connected to the first pipeline.

18. The fluid injection system according to claim 1 comprising a temperature sensor which isolates the fluid injection system when the temperature of the first fluid is within the predetermined temperature range.

19. The fluid injection system according to claim 1 comprising a fourth pipeline extending from the first pipeline to a tap outlet, the fourth pipeline is in fluid communication with a third heat exchanger which is in the form of a third coil located in the holding tank.

20. A fluid injection system which transitions between a maintenance mode wherein an outlet at a flushing station is closed and no fluid is discharged through the outlet, and an operation mode wherein the outlet at the flushing station is open and fluid is discharged through the outlet, the fluid injection system injects a first fluid transported in a first pipeline with a second fluid to produce a third fluid which is at a temperature between that of the first fluid and the second fluid, the fluid injection system comprises:
- a holding tank for storing the second fluid;
- a temperature means to bring the temperature of the second fluid within a predetermined value range;
- a pump for delivering the second fluid into the first pipeline;
- a third pipeline for circulating the third fluid through a heat exchange unit when the fluid injection system is in its maintenance mode;

whereupon the second fluid mixing with the first fluid the third fluid has a temperature which is within a predetermined temperature range, wherein the third fluid is maintained within the predetermined temperature range when the fluid injection system is in either mode such that the temperature of the third fluid made available to the outlet at the flushing station is within the predetermined temperature range.

21. A fluid injection system which transitions between a maintenance mode wherein an outlet at a flushing station is closed and no fluid is discharged through the outlet, and an operation mode wherein the outlet at the flushing station is open and fluid is discharged through the outlet, the fluid injection system injects a first fluid transported in a first pipeline with a second fluid, wherein there is a temperature differential between the first fluid and the second fluid, the fluid injection system comprises:
- a holding tank for storing the second fluid;
- a temperature means to bring the temperature of the second fluid within a predetermined value range;
- a pump for delivering the second fluid into the first pipeline;
- a second pipeline for delivering the second fluid to the first pipeline, the second pipeline incorporating a bypass pipeline to allow low flow rates to flow through the second pipeline;

wherein the second fluid mixes with the first fluid in the first pipeline to provide a combined third fluid having a temperature within a predetermined temperature range, wherein the third fluid circulates through a third pipeline incorporating a heat exchange unit when the system is in the maintenance mode, the third fluid is maintained within the predetermined temperature range when the fluid injection system is in either mode such that the temperature of the third fluid made available to the outlet at the flushing station is within the predetermined temperature range.

* * * * *

UNITED STATES PATENT AND TRADEMARK OFFICE
CERTIFICATE OF CORRECTION

PATENT NO. : 10,022,296 B2
APPLICATION NO. : 15/324643
DATED : July 17, 2018
INVENTOR(S) : Neuwen et al.

Page 1 of 1

It is certified that error appears in the above-identified patent and that said Letters Patent is hereby corrected as shown below:

On the Title Page

In Column 2, under "Other Publications", Line 1, delete "Austrailian" and insert --Australian-- therefor In the Claims In Column 11, Line 42, in Claim 1, delete "fluid;" and insert --fluid,-- therefor Signed and Sealed this
Fourth Day of June, 2019

Andrei Iancu
*Director of the United States Patent and Trademark Office*